United States Patent [19]

Suzuki

[11] Patent Number: 5,682,342
[45] Date of Patent: Oct. 28, 1997

[54] HIGH-SPEED COUNTER

[75] Inventor: Kazumasa Suzuki, Tokyo, Japan

[73] Assignee: NEC Corporation, Tokyo, Japan

[21] Appl. No.: 428,542

[22] Filed: Apr. 25, 1995

[30] Foreign Application Priority Data

Apr. 26, 1994 [JP] Japan .................. 6-088580
Oct. 27, 1994 [JP] Japan .................. 6-263762

[51] Int. Cl.$^6$ ........................................ G06F 7/50
[52] U.S. Cl. ........................ 364/770; 364/715.01
[58] Field of Search ................. 364/770, 715.01, 364/768; 341/93; 377/49, 26

[56] References Cited

U.S. PATENT DOCUMENTS

| | | | |
|---|---|---|---|
| 4,245,327 | 1/1981 | Moriya et al. | 364/768 |
| 4,644,490 | 2/1987 | Kobayashi et al. | 364/748 |
| 4,831,570 | 5/1989 | Abiko | 364/715.01 |
| 4,953,115 | 8/1990 | Kanoh | 364/715.01 |
| 4,994,996 | 2/1991 | Fossum et al. | 364/748 |
| 5,053,987 | 10/1991 | Genusov et al. | 364/736 |
| 5,146,479 | 9/1992 | Okada et al. | 377/41 |
| 5,222,111 | 6/1993 | Muramatsu | 377/49 |
| 5,375,079 | 12/1994 | Uramoto et al. | 364/736 |
| 5,410,721 | 4/1995 | Divine et al. | 395/800 |
| 5,504,698 | 4/1996 | Su | 364/768 |

FOREIGN PATENT DOCUMENTS 2-309423  12/1990  Japan .

Primary Examiner—Reba I. Elmor
Assistant Examiner—Robert J. Dolan
Attorney, Agent, or Firm—Whitham, Curtis, Whitham & McGinn

[57] ABSTRACT

In a counter circuit, an n-bit input signal is stored into a register in response to a clock pulse and then dumped out of the register in response to a subsequent clock pulse and divided into a lower m-bit component and a higher (n-m)-bit component. The lower m-bit component is summed with a 1 to produce a summed m-bit component and a carry if the lower m-bit component is all 1's. The higher (n-m)-bit component is summed with a 1 to produce a summed (n-m)-bit component. In the absence of a carry, the divided (n-m)-bit component is selected and in the presence of the carry the summed (n-m)-bit component is selected. Either of the selected (n-m)-bit components is combined with the summed m-bit component to produce a summed n-bit signal which is stored back into the register.

9 Claims, 4 Drawing Sheets

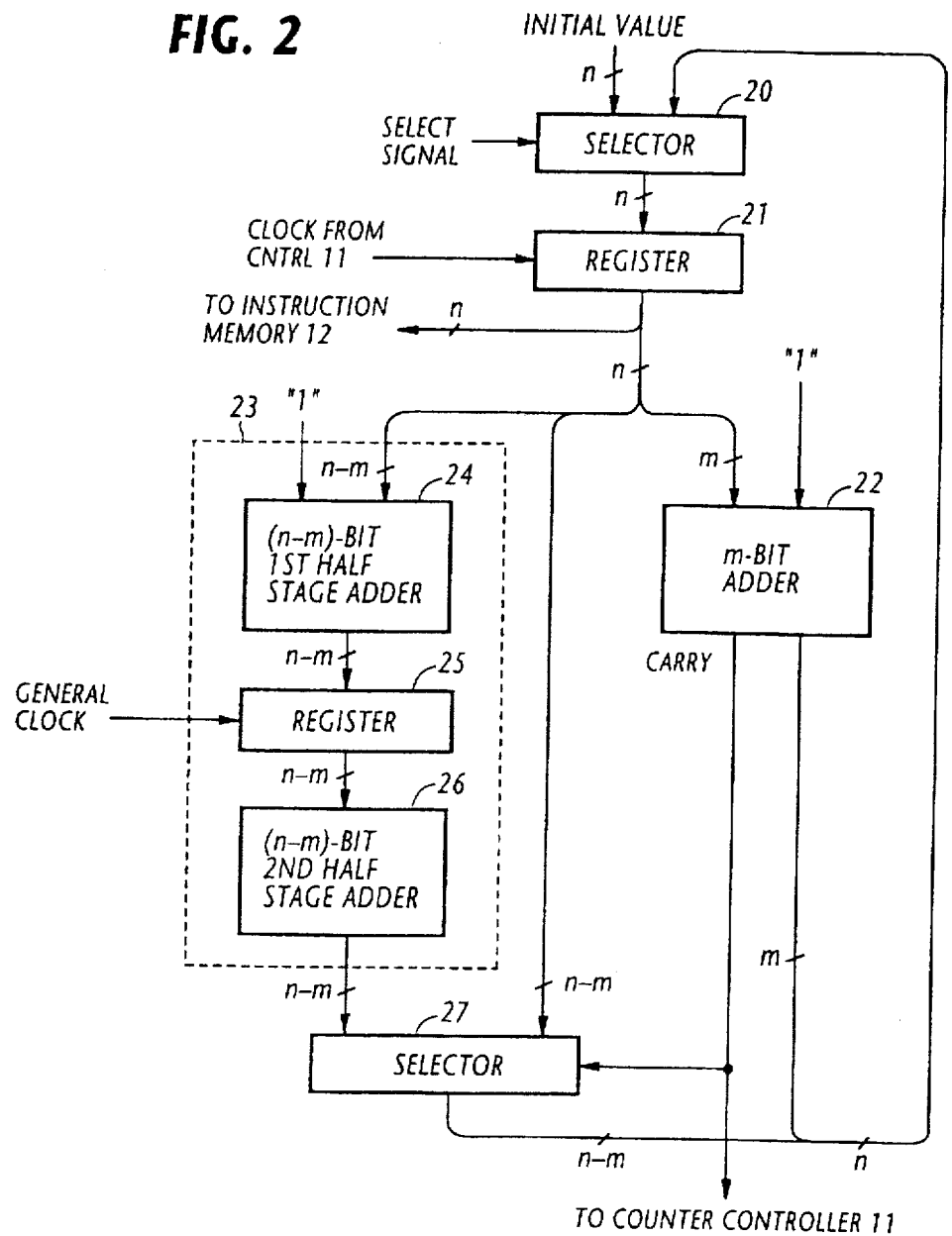

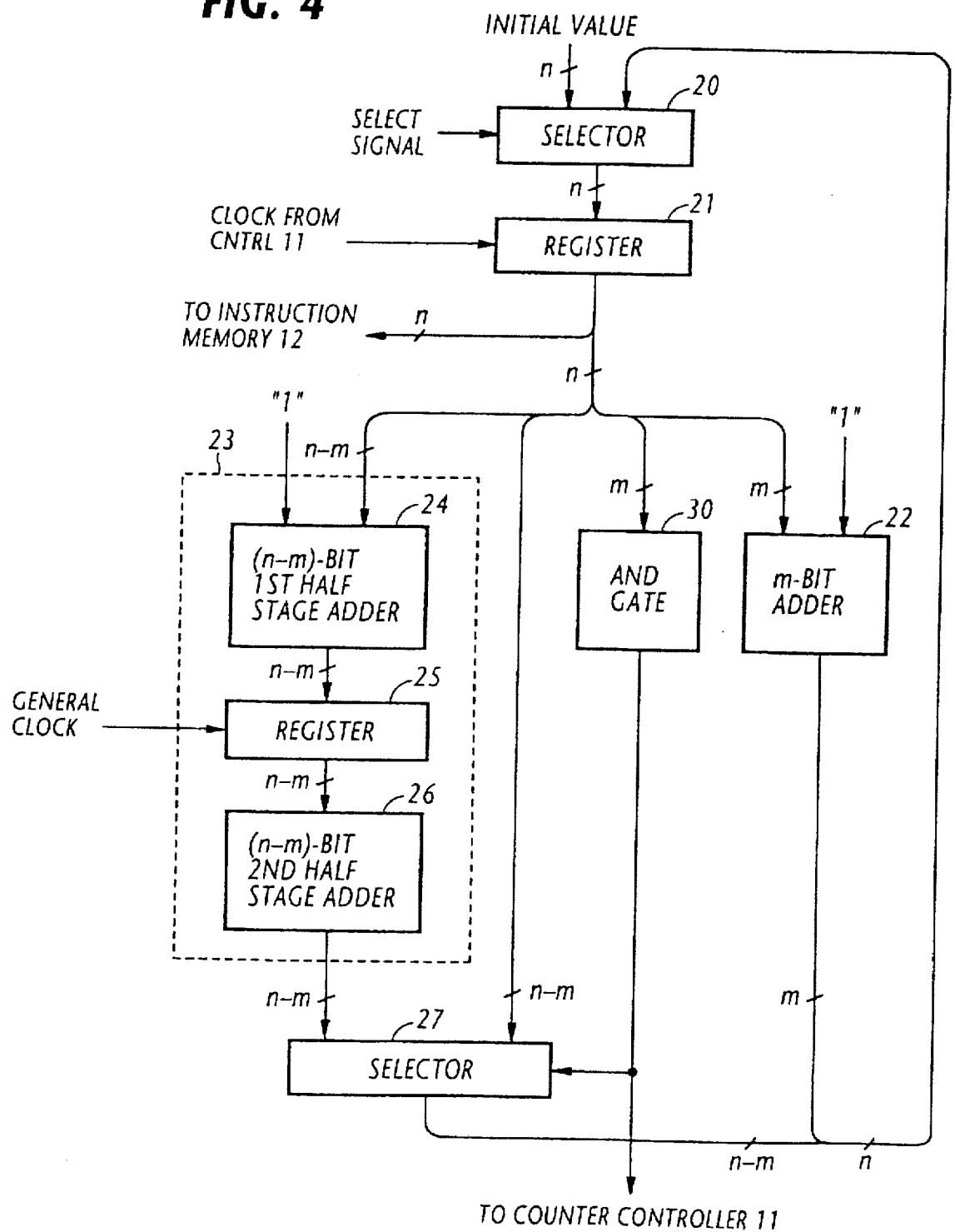

HIGH-SPEED COUNTER

BACKGROUND OF THE INVENTION

1. Field of the Invention

The present invention relates generally to binary counters, and more specifically to a high-speed counter particularly suitable for use in a microprocessors to serve as a program counter.

2. Description of the Related Art

Since the operating performance of a microprocessor is determined by the rate of clock pulses that drive the microprocessor, it is the general trend to increase the clock rate using a pipelining technique.

Japanese Provisional Patent Publication Hei-2-309423 discloses a pipelined microprocessor in which the effective address calculation stage is divided into a higher-bit module and a lower-bit module. In each module, two registers are provided for respectively storing an instruction code and an incremental code. The stored codes are summed by an adder in each module and combined with the output of the other module to produce an effective address. When a carry is generated in the lower-bit module before an adding process is completed for a given address, an interlock request is generated to suspend the pipeline operation. Since the carry occurs at intervals, the interlocking operation lowers the operating performance of a microprocessor.

SUMMARY OF THE INVENTION

It is therefore an object of the present invention to provide a counter capable of operating at such a high speed that when it is used as a program counter of a microprocessor no interlock occurs.

According to the present invention, the stated object is achieved by storing an n-bit input signal into a register in response to a clock pulse, dumping the stored signal out of the register in response to a subsequent clock pulse and dividing the n-bit input signal into a lower m-bit component and a higher (n-m)-bit component. The lower m-bit component is summed with a 1 to produce a summed m-bit component and a carry if the lower m-bit component is all 1's. The higher (n-m)-bit component is summed with a 1 to produce a summed (n-m)-bit component. In the absence of a carry, the divided (n-m)-bit component is selected and in the presence of the carry the summed (n-m)-bit component is selected. Either of the selected (n-m)-bit components is combined with the summed m-bit component to produce a summed n-bit signal which is then stored back into the register.

BRIEF DESCRIPTION OF THE DRAWINGS

The present invention will be described in further detail with reference to the accompanying drawings, in which;

FIG. 2 Is a block diagram of the program counter of FIG. 1;

FIG. 3 is a table illustrating binary status of the various elements of FIG. 2;

FIG. 4 is a block diagram of a modified embodiment of the invention; and

DETAILED DESCRIPTION

Figure 1:
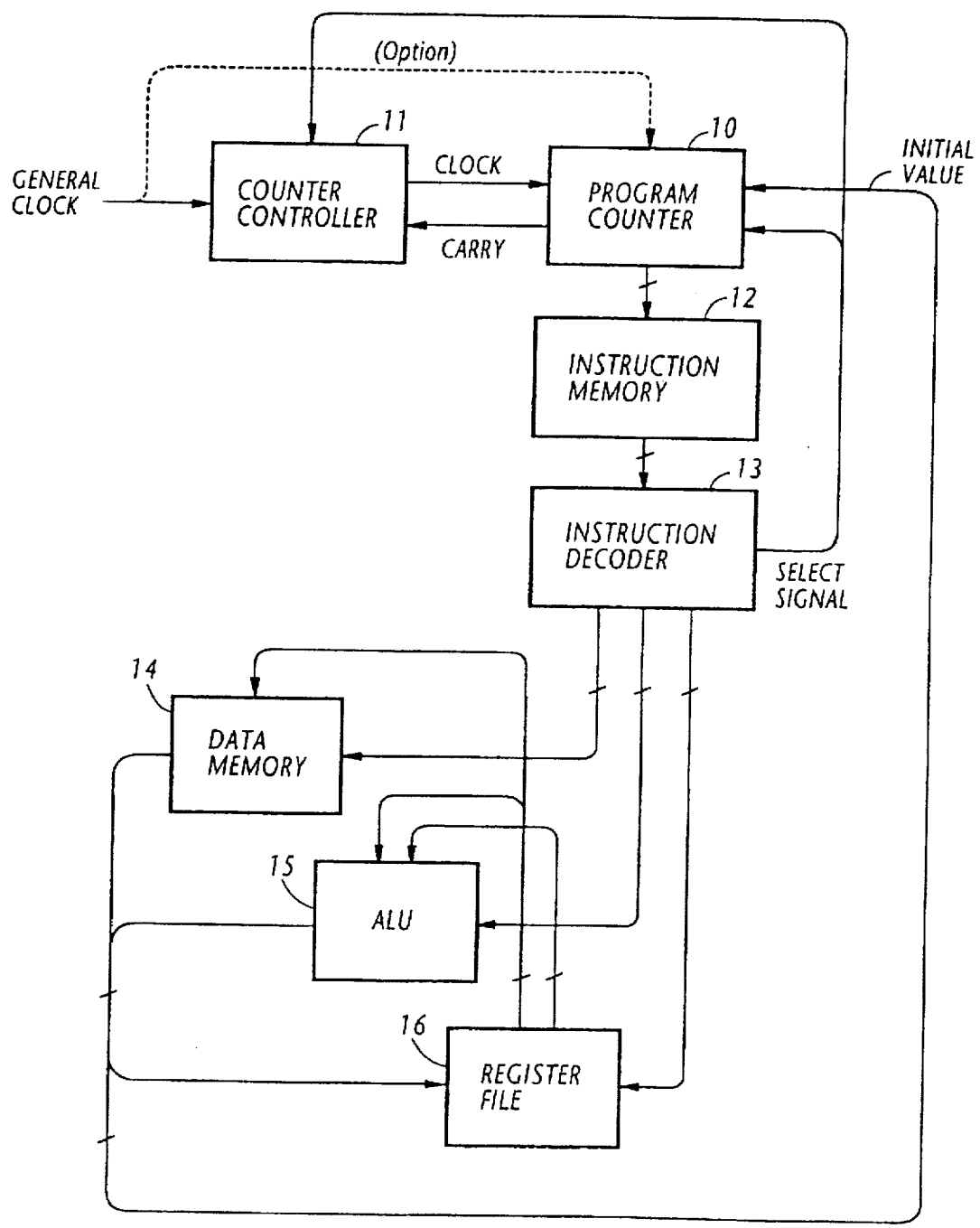
FIG. 1 is a block diagram of a microprocessor incorporating a counter of the present invention as a program counter.

Referring now to FIG. 1, there is shown a microprocessor in which the counter of the present invention is used as a program counter 10 to produce a signal for specifying an address. In the microprocessor, the program counter 10 receives a clock pulse from a counter controller 11 and supplies a carry output and a binary count output to the address input of an instruction memory 12. The output of instruction memory 12 is supplied to an instruction decoder 13 where it is analyzed to provide instruction data to a data memory 14, an arithmetic/logic unit 15 and a register file 16. Additionally, the instruction decoder 13 supplies a select signal to the program counter 10 and counter controller 11 when decoder 13 generates a branch instruction. Register file 16 provides operands to data memory 14 and ALU 15 simultaneously or a single operand to the ALU. The outputs of data memory 14 and ALU 15 are coupled to register file 16. An initial value is supplied from the ALU 15 to the program counter 10. The system operates in a well known manner to provide instruction fetch from memory 12, instruction decoding by decoder 13, operand fetch from data memory 14 and register file 16, execution by ALU 15, and saving executed operands into register file 16.

Counter controller 11 receives a general clock signal and normally supplies this clock signal to the program counter 10. However, it stops the supply of this clock signal to the program counter for a (k-1) clock interval (where k is the number of pipeline stages to be described, in the illustrated embodiment k=2) when a carry output and a select signal are simultaneously generated in order that the program counter 10 operates properly during a period that immediately follows the execution of a branch instruction. As an option, the general clock signal is coupled to the program counter 10 as indicated by broken lines.

As shown in FIG. 2, the program counter 10 includes a selector 20 to which the initial value of n bits is supplied from the ALU 15 as one of its input signals and the select signal from the instruction decoder 13 is applied as a command signal. The n-bit output of selector 20 is applied to a register 21 which is clocked by clock pulses supplied from the counter controller 11. The n-bit output of register 21, which is supplied to the instruction memory 12 as a signal for specifying an address, is divided into a lower "m"-bit component and a higher "n-m"-bit component. In response to a clock pulse from the counter controller 11, the lower-bit component of the n-bit register output is supplied to an m-bit adder 22 and the higher-bit component is supplied to a pipeline adder 23 as well as to a selector 27.

In the m-bit adder 22, a "1" is always added to the LSB position of each m-bit input from register 21 to provide an m-bit output of plus-one sum, which is combined with an (n-m)-bit output from the selector 27 and supplied as a second input signal to the selector 20. The adder 22 supplies a carry output as a select signal to the selector 27 as well as to the counter controller 11.

The pipeline adder 23 is a two-stage pipeline adder formed by a cascade of an (n-m)-bit first half-stage adder 24, an (n-m)-stage register 25 and an (n-m)-bit second half-stage adder 26 which forms a full (n-m)-bit adder with the first-stage adder 24. The first half-stage adder 24 always adds a "1" to the LSB position of the (n-m)-bit input from register 21 and produces an intermediate result of the adding process of the full adder. This intermediate result is latched in the register 25 in response to a clock pulse from the counter controller 11 and then dumped into the second half-stage adder 26. The pipeline register 25 is clocked by the general clock source, not shown. Thus, unlike the register 21, the pipeline register 25 is clocked at all times without interruptions. The second half stage adder 26 produces an (n-m)-bit output at each clock pulse, but for a given higher (n-m)-bit input, a two-clock interval is required to appear its output of plus-one sum. The use of pipeline structure for the higher-bit adder 23 allows it to operate with the high-speed clock of the microprocessor. Therefore, the m-bit adder 22 produces a carry output at periodic intervals at which it reaches the value $2^m$. Whenever a carry output is produced by adder 22 for a given lower-bit input, the arithmetic operation on the corresponding higher-bit input has already been completed in the pipeline adder 23. In response to the carry output from adder 22, the selector 27 selects the output of pipeline adder 23 and in the absence of the carry output it selects the higher-bit output of register 21.

The operation of the program counter will be described below with reference to FIG. 3 by assuming that n=4, m=2 and register 21 produces a binary "1111" during a previous clock cycle so that the higher-bit output of register 21 is "11" and adder 22 produces a carry output (=1) and a binary "00". Thus, during the next (first) clock cycle, pipeline adder 23 produces a higher-bit output "00" which is selected by selector 27 and combined with the lower-bit "00" from adder 22, producing a binary "0000" which is stored back into register 21. Since the output of pipeline adder 23 appears, for a given input, a two-clock interval later, a binary "01" appears at the third clock cycle and continues in subsequent cycles. During the second and later clock cycles, the lower-bit output from adder 22 is successively incremented and a carry output is again produced during the fifth clock cycle to select the higher-bit value "01" from pipeline adder 23 to be combined with the lower-bit value "00". The combined n-bit value, which is stored back into register 21 via selector 20, is incremented by one in response to each clock pulse.

In order to ensure proper operation of the program counter 10 during a period immediately following the execution of a branch instruction, the operation of register 21 is stopped for a clock interval in response to the simultaneous detection by the counter controller 11 of a carry output from the adder 22 and a select signal from the instruction decoder 13 by allowing the pipeline adder 23 to continue operating on the higher-bit value.

Since the carry signal is generated when all input bits of adder 22 are all 1's, it can also be generated by the use of an m-input AND gate 30 as shown in FIG. 4. In this case, a carry output from AND gate 30 is obtained in parallel with the arithmetic operation proceeding in the m-bit adder 22. The output of AND gate 30 is applied as a select signal to the selector 27. The use of the AND gate 30 has the benefit of speeding up the selection control by selector 27, allowing an increase in processing speed.

Since the result of the pipeline adder 23 is used ($2^m-1$) clock intervals after the entry of each m-bit input to the adder 22, the pipeline adder 23 can be implemented with up to ($2^m-1$) pipeline stages. Otherwise, if the adder 23 produces indefinite values for a few clock cycles immediately following the entry of an input value, no situations exist at all for using such indefinite values.

Figure 5:
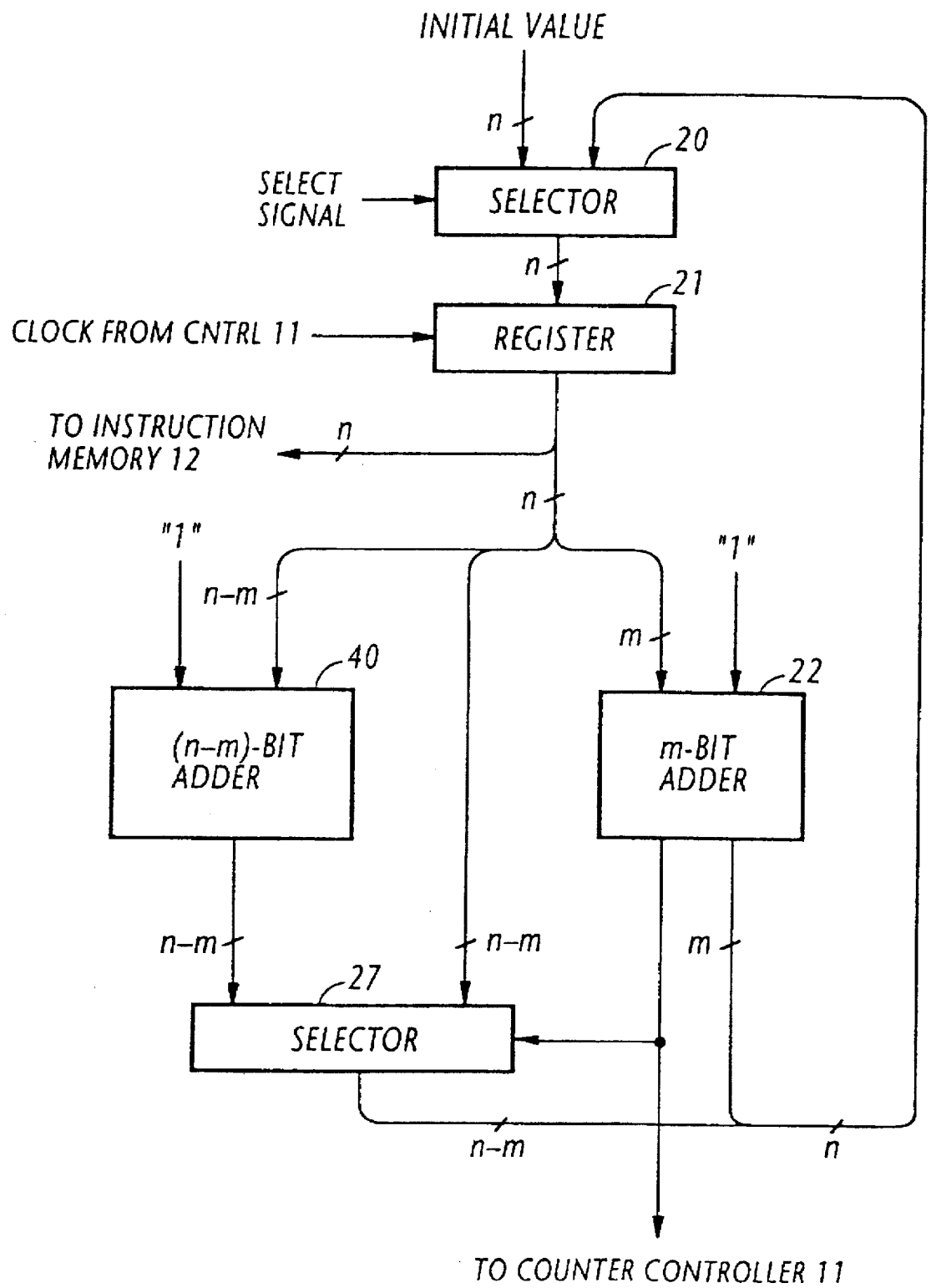
FIG. 5 is a block diagram of a further modification of the invention.

It is seen therefore that, instead of the adder 23 of pipeline structure, a simple (n-m)-bit adder 40 can be used, as illustrated in FIG. 5, for summing a 1 to the higher (n-m)-bit input from the register 21 to produce an (n-m)-bit output as one input of the selector 27.

What is claimed is:

1. A binary counter comprising:
   a register for storing an n-bit input signal in response to a clock pulse supplied thereto, said n-bit input signal having a lower m-bit component and a higher (n-m)-bit component;

an m-bit adder for adding a "1" to said lower m-bit component of the input signal and producing a summed m-bit component and producing a carry signal when said lower m-bit component comprises all 1's;

an (n-m)-bit adder for adding a "1" to said higher (n-m)-bit component of the input signal and producing a summed (n-m)-bit component; and a selector for selecting the (n-m)-bit component of the register in the absence of said carry signal or selecting the summed (n-m)-bit component of the (n-m)-bit adder in the presence of said carry signal, said selector for combining either of the selected (n-m)-bit components with the summed m-bit component of the m-bit adder using said (n-m)-bit component as a higher order component and said m-bit component as a lower order component, thereby producing an n-bit output of the binary counter and said selector for storing said n-bit output into said register, said binary counter being connected to a microprocessor having an instruction memory and a controller, said n-bit signal from said register being applied to said instruction memory and said carry signal being applied to said controller.

2. A binary counter as claimed in claim 1, wherein said (n-m)-bit adder comprises a plurality of pipeline stages.

3. A binary counter comprising:
   a register for storing an n-bit input signal in response to a clock pulse supplied thereto, said n-bit input signal having a lower m-bit component and a higher (n-m)-bit component;

an m-bit adder for adding a "1" to said lower m-bit component of the input signal and producing a summed m-bit component;

an AND gate for producing a carry signal when said lower m-bit component comprises all 1's;

an (n-m)-bit adder for adding a "1" to said higher (n-m)-bit component of the input signal and producing a summed (n-m)-bit component; and a selector for selecting the (n-m)-bit component of the register in the absence of said carry signal or selecting the summed (n-m)-bit component of the (n-m)-bit adder in the presence of said carry signal, said selector for combining either of the selected (n-m)-bit components with the summed m-bit component of the m-bit adder using said (n-m)-bit component as a higher order component and said m-bit component as a lower order component, thereby producing an n-bit output of the binary counter and said selector for storing said n-bit output into said register, said binary counter being connected to a microprocessor having an instruction memory and a controller, said n-bit signal from said register being applied to said instruction memory and said carry signal being applied to said controller.

4. A binary counter as claimed in claim 3, wherein said (n-m)-bit adder comprises a plurality of pipeline stages.

5. A program counter for use in a microprocessor, comprising:
   a first selector having a first input for receiving an n-bit initial signal produced by the microprocessor and a second input for receiving an n-bit output signal of the program counter, and selecting one of the first and second inputs in response to a select signal from the microprocessor;

a register for storing either of the n-bit signals selected by the first selector in response to a clock pulse supplied thereto from a controller of the microprocessor, the stored n-bit signal having a lower m-bit component and a higher (n-m)-bit component;

an m-bit adder for adding a "1" to said lower m-bit component and producing a summed m-bit component and producing a carry signal when said lower m-bit component comprises all 1's;

an (n-m)-bit adder for adding a "1" to said higher (n-m)-bit component and producing a summed (n-m)-bit component; and a second selector for selecting the (n-m)-bit component of the register in the absence of said carry signal or selecting the summed (n-m)-bit component of the (n-m)- bit adder in the presence of said carry signal, said second selector for combining either of the selected (n-m)-bit components with the summed m-bit component of the m-bit adder using said (n-m)-bit component as a higher order component and said m-bit component as a lower order component thereby producing said n-bit output and said selector for applying said n-bit output to the second input of said first selector, the n-bit signal from said register being applied to an instruction memory of said microprocessor and said carry signal being applied to said controller.

6. A program counter as claimed in claim 5, wherein said (n-m) bit adder comprises a plurality of pipeline stages.

7. A program counter for use in a microprocessor, comprising:

a first selector having a first input for receiving an n-bit initial signal produced by the microprocessor and a second input for receiving an n-bit output signal of the program counter, and selecting one of the first and second inputs in response to a select signal from the microprocessor;

a register for storing either of the n-bit signals selected by the first selector in response to a clock pulse supplied thereto from a controller of the microprocessor, the stored n-bit signal having a lower m-bit component and a higher (n-m)-bit component;

an m-bit adder for adding a "1" to said lower m-bit component and producing a summed m-bit component;

an AND gate for producing a carry signal when said lower m-bit component comprises all 1's;

an (n-m)-bit adder for adding a "1" to said higher (n-m)-bit component and producing a summed (n-m)-bit component; and a second selector for selecting the (n-m)-bit component of the register in the absence of said carry signal or selecting the summed (n-m)-bit component of the (n-m)- bit adder in the presence of said carry signal, said second selector for combining either of the selected (n-m)-bit components with the summed m-bit component of the m-bit adder using said (n-m)-bit component as a higher order component and said m-bit component as a lower order component, thereby producing said n-bit output and said selector for applying said n-bit output to the second input of said first selector, the n-bit signal from said register being applied to an instruction memory of said microprocessor and said carry signal being applied to said controller.

8. A program counter as claimed in claim 7, wherein said (n-m)-bit adder comprises a plurality of pipeline stages.

9. A method of counting a clock pulse, comprising steps of:

a) storing an n-bit input signal into a register in response to a clock pulse, dumping the stored signal out of the register in response to a subsequent clock pulse and dividing the n-bit input signal into a lower m-bit component and a higher (n-m)-bit component;

b) adding a "1" to said lower m-bit component of the input signal and producing a summed m-bit component;

c) producing a carry signal when said lower m-bit component comprises all 1's;

d) adding a "1" to said higher (n-m)-bit component of the input signal and producing a summed (n-m)-bit component;

e) selecting the (n-m)-bit component divided by the step (a) in the absence of said carry signal or selecting the summed (n-m)-bit component of the step (d) in the presence of said carry signal; and f) combining either of the selected (n-m)-bit components with the summed m-bit component of the step (b) using said (n-m)-bit component as a higher order component and said m-bit component as a lower order component to produce a summed n-bit signal; and g) storing the summed n-bit signal into the register.

\* \* \* \* \*